Oct. 3, 1967  P. F. SCHMIDT ET AL  3,345,275
ELECTROLYTE AND DIFFUSION PROCESS
Filed April 28, 1964
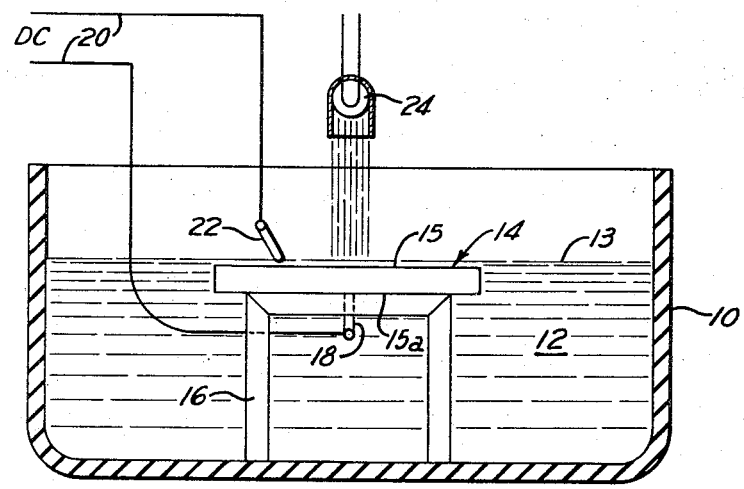
INVENTORS.
PAUL F. SCHMIDT,
GERALD D. ROSE
BY
C. L. Menzemer
ATTORNEY.

United States Patent Office

3,345,275
Patented Oct. 3, 1967

3,345,275
ELECTROLYTE AND DIFFUSION PROCESS
Paul F. Schmidt, Pittsburgh, Pa., and Gerald D. Rose, Indianapolis, Ind., assignors to Westinghouse Electric Corporation, Pittsburgh, Pa., a corporation of Pennsylvania
Filed Apr. 28, 1964, Ser. No. 363,236
8 Claims. (Cl. 204—15)

This invention relates to the formation of anodic oxide layers or films on semiconductors and in particular it concerns the development of phosphorus doped anodic oxide layers on silicon as well as processes utilizing the resulting layers.

It is a primary object of the present invention to provide a process by which a semiconductive substrate is provided with a phosphorus doped oxide layer thereon that is easily practiced with an electrolyte that does not interfere with the anodization process.

Another object of the invention is to provide an electrolyte for the anodic oxidation of semiconductive substrates which electrolyte permits the use of high forming voltages, results in good oxide formation, results in oxide having a substantial quantity of phosphorus therein and which does not form bubbles during use.

Another object is to provide a novel electrolyte for use in anodic oxidation procedures, the electrolyte comprising solutions of pyrophosphoric acid ($H_4P_2O_7$) in tetrahydrofurfuryl alcohol.

Still another object of the invention is a novel method to provide the simultaneous diffusion of two materials into a body of semiconductive material.

Other objects will be apparent from time to time in the following detailed discussion and description.

Oxide films on the surfaces of semiconductive substrates can be employed for different purposes. For example, they can serve as a selective mask to prevent the diffusion of certain specific impurities into the bulk material and for the passivation of the surface of the semiconductive material. Where the oxide film contains a doping impurity, the oxide film can constitute a diffusion source.

Oxide films have heretofore been provided on the surfaces of semiconductive silicon by an anodization process. As far as is known, prior to the present invention there was available no electrolyte for anodization processes in which phosphorus could be included in the oxide layer being produced without encountering the evolution of gas bubbles at the high forming voltages used.

In accordance with the present invention these and other objections have been overcome and there is provided an electrolyte by which phosphorus can be included in an anodic oxide film formed on semiconductive materials such, for example, as silicon, the electrolyte permitting the utilization of high forming voltages without development of gas bubbles. Consequently such oxide films can be produced on n-type semiconductive silicon, where illumination is employed to control the geometry of the oxide produced, since the absence of bubble formation avoids the light scattering problem that otherwise would have occurred. Further, avoidance of bubbles is also desirable on p-type material in order to attain the best type oxide films and the electrolyte of the invention can likewise be used therefor.

The new electrolyte of the present invention comprises a solution of pyrophosphoric acid ($H_4P_2O_7$) in tetrahydrofurfuryl alcohol. By the term pyrophosphoric acid is meant mixtures of the various phosphoric acids having an empirical composition of $H_4P_2O_7$, or generally those mixtures having a $P_2O_5$ content of at least 75 weight percent and preferably about 78 weight percent. It has been found that the reproducibility of results is adversely influenced by the presence of water and accordingly anhydrous acids having a $P_2O_5$ content of about 78 percent are preferred. The pyrophosphoric acid content of the alcohol solution generally is within the range of about 2 to 25 volume precent based on solution. Preferably the content is within the range of about 12 to 18 volume percent. As a generalization, the higher the pyrophosphoric acid content, the higher will be the phosphorus content in the resulting oxide film.

The pyrophosphoric acid used in the present invention can be prepared by any method desired. One convenient method employs commercial 105 percent phosphoric acid, which contains about 42 percent pyrophosphoric acid. The density of the acid is measured and from that measurement there is calculated the amount of water that must be removed to increase the pyrophosphoric content thereof to the maximum of 49 weight percent. Then the water is boiled from the 105 percent acid and is condensed. When the predetermined amount of water is collected, the process is halted. Of course other procedures may also be employed.

In order to provide an anodic oxide film of appreciable thickness under geometry control the semiconductor must be able to support an appreciable reverse bias in darkness. Consequently, it is critical that the semiconductor used in this invention, for example n-type silicon, have a resistivity of at least one ohm-cm. or higher, for example 10 to 100 ohm-cm. or higher.

For front surface illumination, the thickness of the semiconductor is not material to the process. However, for back surface illumination, the semiconductive material must be relatively thin, for example less than about 6 mils. Particularly suitable material that is available is known as webbed dendritic silicon, which can be prepared in accordance with the teaching of the United States patent application of Dermatis and Faust, Jr., Ser. No. 98,618, filed Mar. 27, 1961 and now Patent No. 3,129,-061, which is assigned to the assignee of the present application. These webbed dendrites are available in thicknesses as low as 2 to 8 mils. Consequently they are particularly suitable for geometry control by illumination of the back of the web, which may be dry. On the other hand, they are also desirable for direct illumination of the surface being anodized. A cross-section of a webbed dendrite perpendicular to the main axis of the web is somewhat similar to a dumbbell. Consequently, the webbed dendrite provides a natural trough in which the electrolyte may be maintained. Moreover the amount of electrolyte held therein is quite small and therefore causes but minor distortion of light passing through it.

The description of the invention will be continued in conjunction with the attached drawing showing, schematically, apparatus for the anodization of n-type silicon in accordance with the invention.

Referring to the drawing, there is provided a container 10 suitable for holding a quantity of the electrolyte 12 needed to practice the invention. The container 10 can be made of any material desired, for example, glass, plastic, ceramic or other electrically non-conducting material. Within the container is a slice 14 of n-type silicon that may be of any convenient size, and may be of any resistivity that is at least one ohm-cm. or higher. For p-type material there is no lower limit on resistivity. The slice 14 of silicon is supported by a non-conducting means 16, that may, if desired, be made of material similar to that employed for container 10. The size of support 16 and the quantity of electrolyte 12 employed are interrelated in this embodiment to the extent that the upper surface 15 of the slice 14 of n-type silicon is just under the upper surface 13 of the body of electrolyte 12. As already noted, light distortion is a problem that is to be minimized, and the thinner the body of electrolyte on the upper surface 15 of the slice 14 of n-type silicon the less will be the distortion of light passing through it. A first electrode 18 is in ohmic contact with the rear surface 15a of the slice 14 of silicon, and that electrode is connected to a first pole of a D.C. power source 20. To provide ohmic contact, a low work function metal such as aluminum or zinc is evaporated thereto, and then a lead is soldered to the metal deposit. A second electrode 22 made, for example of platinum, is immersed in the electrolyte 12 just above the surface 15 of the slice 14 of silicon. Electrode 22 is connected to the other side of the D.C. power source 20 and is the negative electrode. Finally, a light source 24 that is controllable in the sense that its light beams can be directed to localized places when desired, is also provided above the upper surface 13 of the electrolyte 12. Suitably, a desired light pattern can be focused on the semiconductor through an inverted microscope if it is a silicon web. Any other manner of control desired can be used as well. While various light sources can be employed for illumination, blue light (about 4700 A.) has been found to be the most satisfactory for front surface illumination since it is completely absorbed in silicon within the first few microns from its surface. For back surface illumination, white or other light is used. Since ambient illumination would interfere with the process, the entire unit can be enclosed in a container that is opaque.

Current flows in this anodization process of high resistivity n-type silicon upon the application of the light to the silicon surface, with a potential applied thereto. Thus the anodic current density (instantaneous) is a function of light intensity for different constant voltages. The amount of phosphorus incorporated in an oxide film is essentially independent of current density in the range of 3 to 5 milliamps per cm. In general a light intensity of at least 4 photons per silicon atom in the surface of the silicon is used in the anodic oxidation process though up to about 20 times that amount of light can be used. For best practice in geometry control procedures, the minimum light intensity should be used so that all injected carriers can be used for oxide growth.

In operation to provide an anodic film on the slice of n-type silicon using, for example, about 15 volume percent of pyrophosphoric acid in tetrahydrofurfuryl alcohol as the electrolyte, the power from the D.C. source 20 is turned on to provide a voltage of up to about 150 volts or more and the light source 24 is activated to project blue light to the surface of the silicon where oxidation is to occur. These conditions are maintained for a sufficient length of time, i.e. less than about ½ hour, until an oxide film on the order of 500 angstroms results. In numerous tests it has been found that about 5 angstroms thickness is achieved per volt of forming voltage. Since this electrolyte permits use of high forming voltages, this is another particular advantage of the invention. Oxide films have been grown up to about 3000 angstroms (non-geometry control) in thickness and with a phosphorus pentoxide content up to about 23 weight percent, or concentrations up to about $4 \times 10^{21}$ atoms per cc.

As noted hereinbefore, an oxide film produced in accordance with this invention has a substantial phosphorus content, and consequently may serve as a diffusion source. This is used to advantage in accordance with a related discovery that we have made.

The concentration of the phosphorus in the anodic oxide source, the temperature of the silicon substrate, and the temperature of the gallium source can be adjusted such that the diffusivity of phosphorus is less than that of gallium, but the surface concentration of phosphorus in the silicon resulting under this set of conditions is higher than that of the gallium. Thus NPN structures will result because the gallium can thereby be made to diffuse further than the phosphorus under these diffusion conditions. With n-type silicon bulk material this provides, in a single diffusion process, a double diffused transistor structure of the NPN type. This diffusion process can be carried out at a temperature of about 1000° to 1250° C. for one-half to 20 hours or more in a furnace containing an atmosphere of gallium maintained at a temperature of about 800° to 950° C., for example 900° C. Generally, the depth of the junctions resulting is largely a function of time of diffusion and may vary, for example, from 2 to 40 microns or more.

The invention will be described further in conjunction with the following example in which the details are given by way of illustration and not by way of limitation.

*Example I*

A slice of n-type silicon having dimensions of 1 x 2 cm. and a resistivity of 30 ohm-cm. was used. This was etched for one minute in a mixture of 9 parts nitric acid and one part hydrofluoric acid. The silicon slice was then submerged slightly below the surface of a concentrated (15 volume percent) solution of pyrophosphoric acid in tetrahydrofurfuryl alcohol. One lead of a DC source was attached in ohmic contact to its rear surface, and the other lead was attached to a platinum electrode located in the electrolyte near the upper surface of the slice of silicon. A light beam was then focused on the upper surface of the silicon. With the applied voltage at 100 volts, an oxide film was grown on the n-type silicon where it was exposed to light to a thickness of about 500 angstroms. Analysis of the resultant film showed a phosphorus ($P_2O_5$) concentration of about 14 percent by weight. It was found that the oxide was dense and free from defects as shown by electron micrographs, contrary to what would normally result when the electrolyte produced bubbles.

Several of the resulting anodized silicon slices were placed in a quartz tube furnace back filled with argon; the furnace was a two temperature zone furnace and the silicon was heated to about 1175° C. A container of gallium, heated to 900° C., was in the second temperature zone of the furnace to provide a gallium vapor. In different runs, these conditions were maintained for 1½ to 5⅙ hours. The oxide films had been grown at 100 and 150 volts. Study of the resulting structures showed the following: for a silicon sample anodized at 100 volts and diffused for 1½ hours, there resulted an n+/pn junction at 4.42 microns and an n+/pn junction at 4.77 microns. For a sample anodized at 150 volts and diffused for 5⅙ hours, there resulted an n+/pn junction 6.52 microns from the surface and an n+p/n junction at 9.64 microns.

Numerous other runs were made with other electrolytes of the invention, at different acid concentrations in the alcohol and there resulted phosphorus doped, dense oxide layers on the n-type silicon where it was illuminated. It is thereby evident that the electrolyte is unique in permitting the formation of anodic films at high forming voltages, and therefore large thickness films, without encountering bubble formation. From the data presented from the diffusion process, it is further evident that the invention provides a convenient and effective way of making shallow-junction transistor structures.

The invention has been described with respect to specific conditions, materials and the like. However, it should be evident that the invention is not to be unnecessarily limited thereby. For example, although use of the electrolyte has been discussed with respect to n-type material, it can as well be used to provide similar films on p-type semiconductive material.

Other substitutions, changes and the like can also be made without departing from the scope of the invention. All percentages given are by weight unless otherwise stated or apparent.

What is claimed is:

1. An electrolyte for the anodic oxidation of semiconductive silicon comprising tetrahydrofurfuryl alcohol containing pyrophosphoric acid.

2. An electrolyte for the anodic oxidation of semiconductive silicon comprising a solution containing about 5 to 25 volume percent of pyrophosphoric acid and the remainder tetrahydrofurfuryl alcohol.

3. A method comprising immersing at least a surface of a wafer of semiconductive silicon in an electrolyte comprising a solution of pyrophosphoric acid in tetrahydrofurfuryl alcohol, and passing a direct current through the solution and the silicon whereby silicon oxide containing phosphorus is grown on the immersed surface of the silicon.

4. A method in accordance with claim 3 in which said silicon is n-type and it is illuminated while being anodized.

5. A method comprising heating at an elevated temperature a wafer of semiconductive silicon having on one major surface a phosphorus-containing layer of silicon oxide, heating gallium at a lower temperature in the presence of the heated wafer, the said lower temperature being sufficient to provide a substantial vapor pressure of gallium in contact with the layer of silicon oxide on the wafer of semiconductive silicon, and maintaining those conditions of heating whereby gallium and phosphorus diffuse through the silicon oxide into the wafer of semiconductive silicon.

6. A method in accordance with claim 5 in which the heating is continued sufficiently to diffuse the gallium through and beyond the portion of the wafer of semiconductive silicon into which phosphorus has diffused.

7. A method of preparing NPN semiconductive silicon comprising immersing at least a surface portion of a body of semiconductive silicon of n-type semiconductivity in an electrolyte comprising a solution of pyrophosphoric acid, passing an electric current through the electrolyte and silicon while at least part of the immersed surface is illuminated, to form a phosphorus-containing silicon oxide layer on the immersed and illuminated part of the surface of the semiconductive silicon, then placing the resulting body of semiconductive silicon in a controlled atmosphere furnace, heating the silicon therein to a temperature to diffuse phosphorus from the layer into the body of silicon, while heating gallium in the atmosphere in contact with the body of semiconductive silicon to generate gallium vapor therein, the gallium being heated at a temperature below that at which the silicon is heated, and maintaining those conditions until gallium diffuses through the oxide and through and beyond the portion of the wafer into which phosphorus diffuses.

8. A method in accordance with claim 7 in which the electrolyte comprises a solution containing about 2 to 25 volume percent of pyrophosphoric acid and the remainder tetrahydrofurfuryl alcohol.

References Cited
UNITED STATES PATENTS

| | | | |
|---|---|---|---|
| 2,909,470 | 10/1959 | Schmidt | 204—14 |
| 3,147,152 | 9/1964 | Mendel | 148—187 |
| 3,183,129 | 5/1965 | Tripp | 148—190 |
| 3,200,019 | 8/1965 | Scott et al. | 148—187 |
| 3,203,840 | 8/1965 | Harris | 148—187 |
| 3,261,773 | 7/1966 | Sandmann et al. | 204—32 |

FOREIGN PATENTS

| | | |
|---|---|---|
| 1,065,943 | 9/1959 | Germany. |

JOHN H. MACK, *Primary Examiner.*

T. TUFARIELLO, *Assistant Examiner.*